A. R. HAVENER.
LACING HOOK DOUBLE SET MACHINE.
APPLICATION FILED MAR. 2, 1915.

1,169,812.

Patented Feb. 1, 1916.
12 SHEETS—SHEET 1.

Witnesses:
Leonard A. Powell.
Herman R. Hoffman

Inventor:
Arthur R. Havener,
by his attorney, Charles V. Goodwin

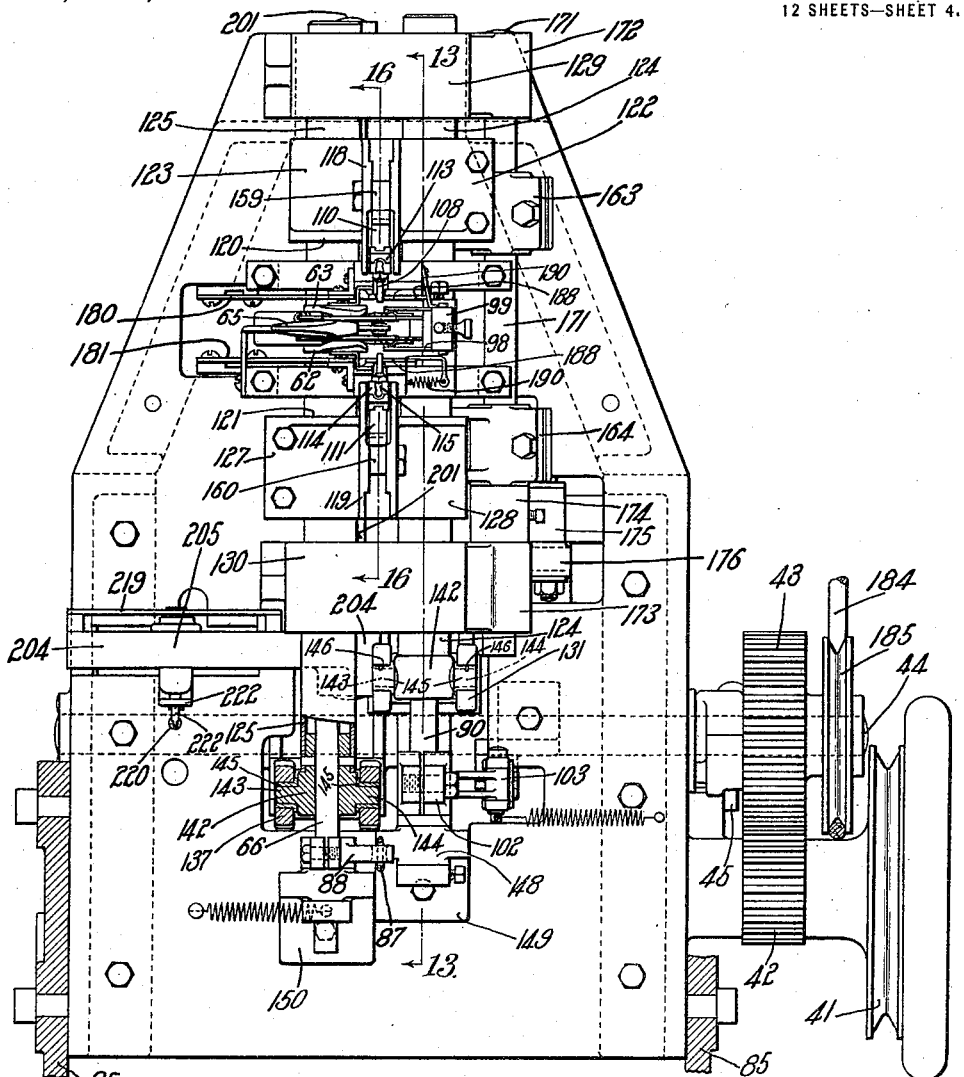

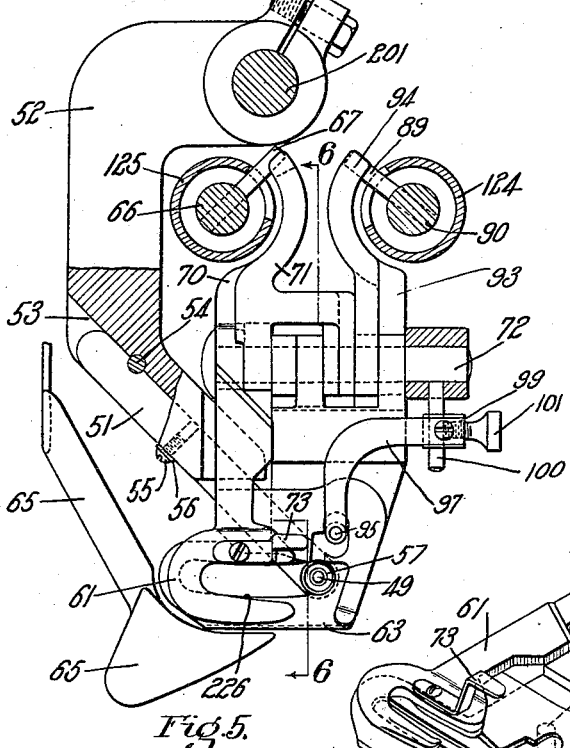

A. R. HAVENER.
LACING HOOK DOUBLE SET MACHINE.
APPLICATION FILED MAR. 2, 1915.

1,169,812.

Patented Feb. 1, 1916.
12 SHEETS—SHEET 6.

Witnesses:
Lernard A Powell
Herman R. Hoffman.

Inventor:
Arthur R. Havener,
by his attorney, Charles T. Gooding.

A. R. HAVENER.
LACING HOOK DOUBLE SET MACHINE.
APPLICATION FILED MAR. 2, 1915.
1,169,812.
Patented Feb. 1, 1916.
12 SHEETS—SHEET 8.
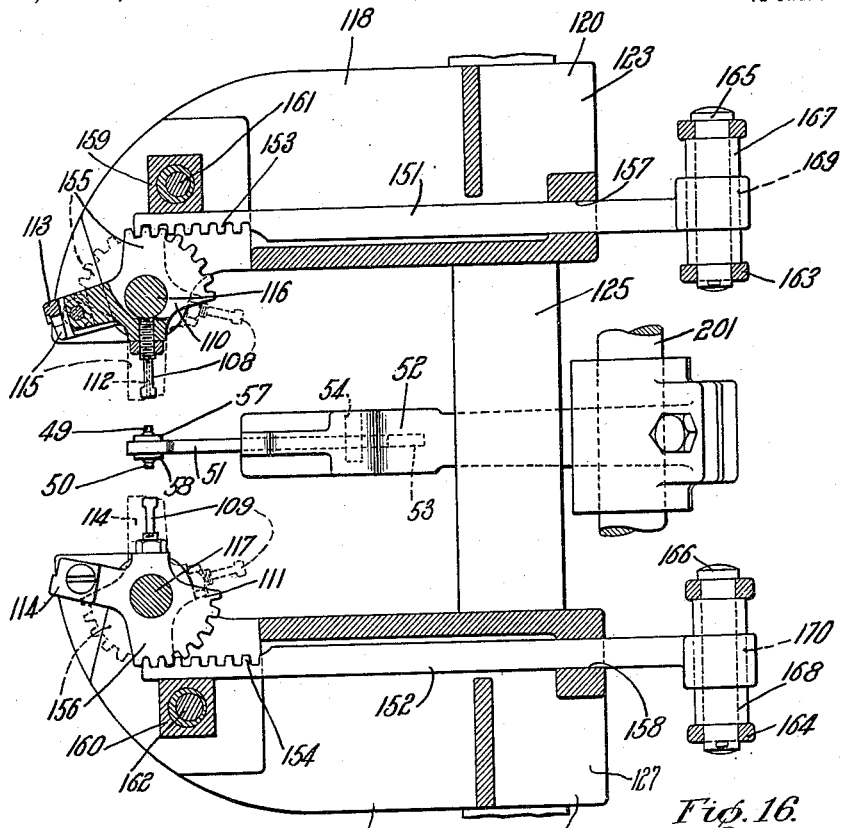
Fig. 16.
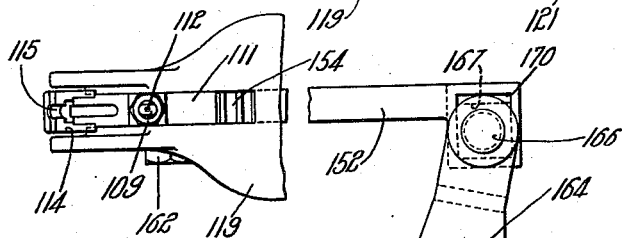
Fig. 17.
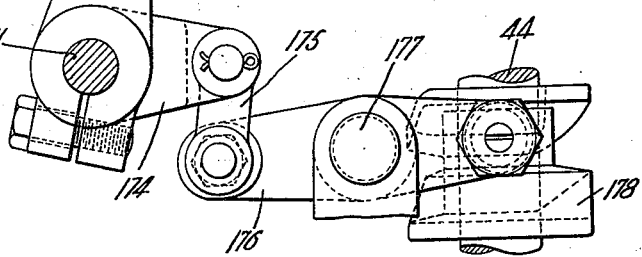
Witnesses:
Leonard R. Powell.
Herman R. Hoffman.
Inventor
Arthur R. Havener
by his attorney, Charles J. Gooding.

A. R. HAVENER.
LACING HOOK DOUBLE SET MACHINE.
APPLICATION FILED MAR. 2, 1915.
1,169,812.
Patented Feb. 1, 1916.
12 SHEETS—SHEET 9.
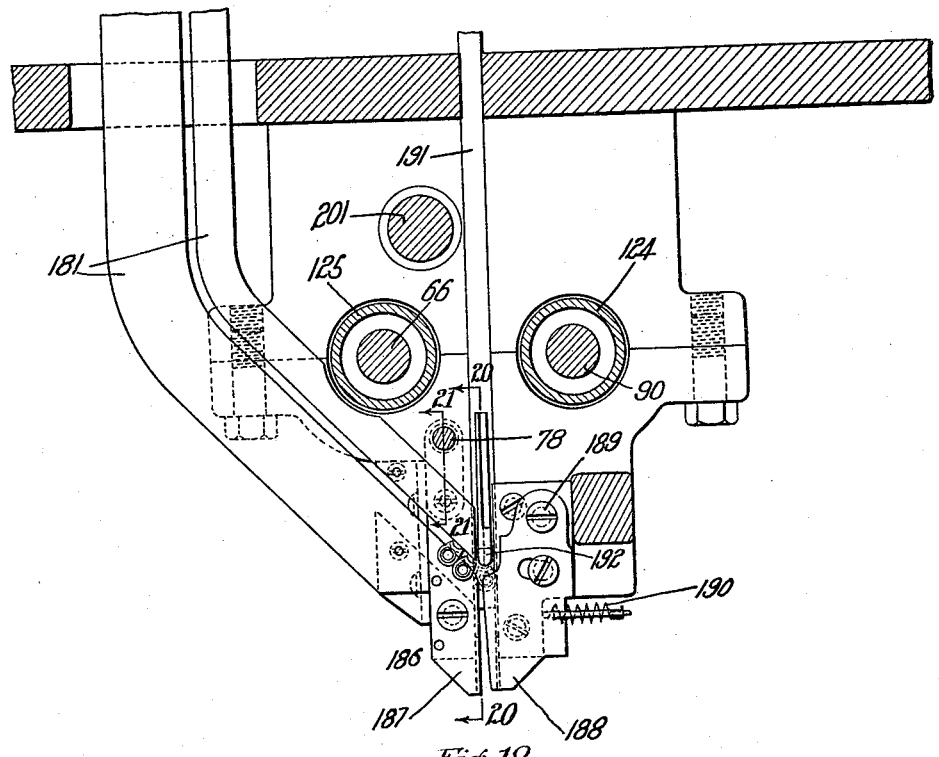
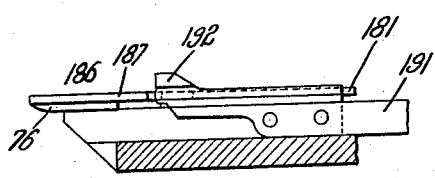
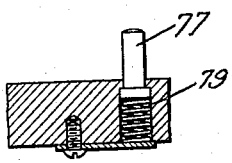
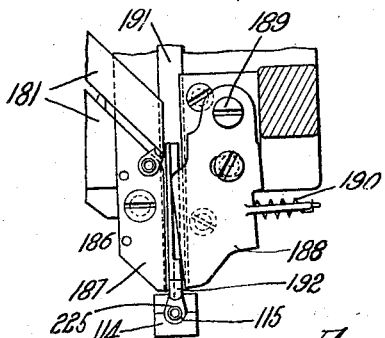
Witnesses:
Leonard A. Powell.
Herman R. Hoffman.
Inventor:
Arthur R. Havener
by his attorney
Charles L. Goodrich.

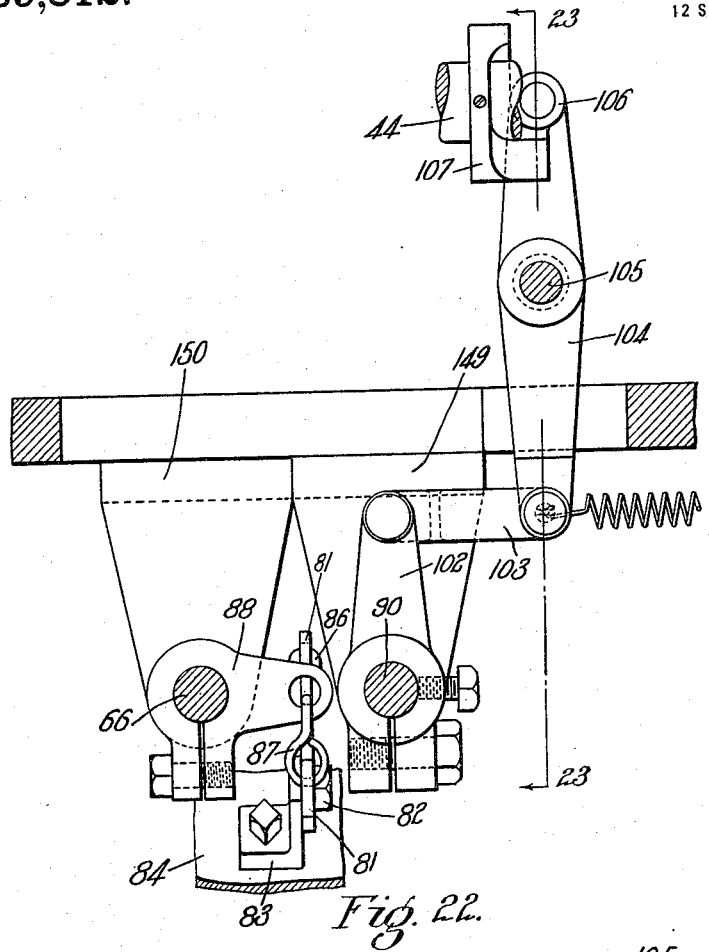
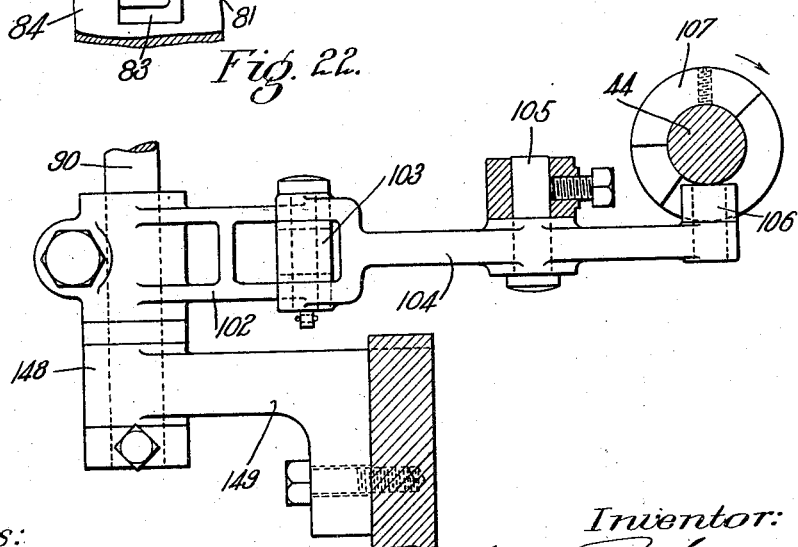

A. R. HAVENER.
LACING HOOK DOUBLE SET MACHINE.
APPLICATION FILED MAR. 2, 1915.

1,169,812.

Patented Feb. 1, 1916.
12 SHEETS—SHEET 11.

Witnesses:
Lernard A. Powell.
Herman R. Hoffman.

Inventor:
Arthur R. Havener
by his attorney

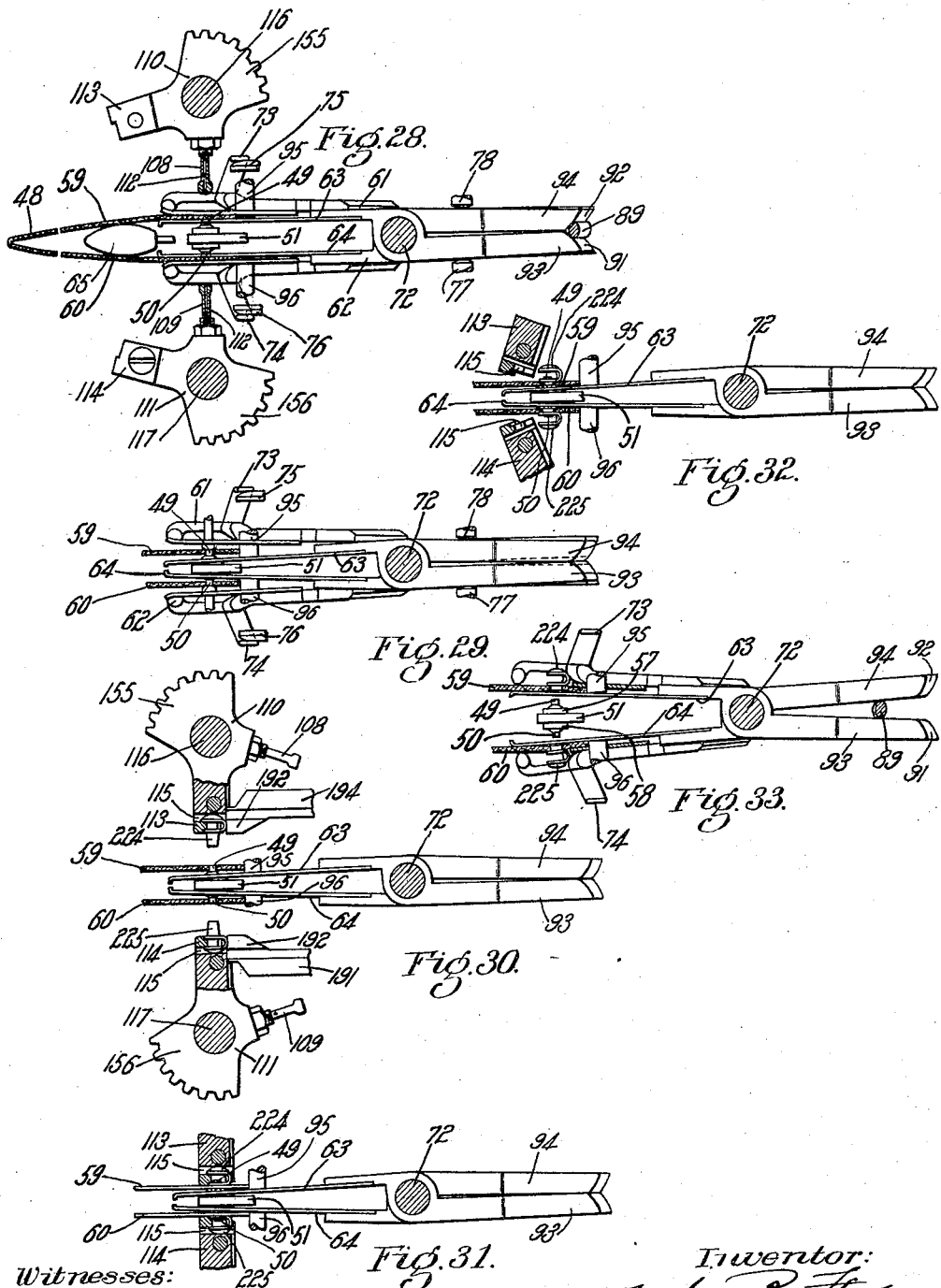

UNITED STATES PATENT OFFICE.

ARTHUR R. HAVENER, OF WALTHAM, MASSACHUSETTS, ASSIGNOR TO AMERICAN LACING HOOK CO., A CORPORATION OF NEW JERSEY.

LACING-HOOK DOUBLE-SET MACHINE.

1,169,812.      Specification of Letters Patent.      Patented Feb. 1, 1916.

Application filed March 2, 1915. Serial No. 11,590.

*To all whom it may concern:*

Be it known that I, ARTHUR R. HAVENER, a citizen of the United States, residing at Waltham, in the county of Middlesex and State of Massachusetts, have invented new and useful Improvements in Lacing-Hook Double-Set Machines, of which the following is a specification.

This invention relates to lacing hook setting machines, the object of the invention being to provide a lacing hook setting machine in which the upper is punched for two lacing hooks on the opposite edges of said upper, the lacing hooks then being simultaneously set in the holes thus punched and the upper being automatically fed to space the lacing hooks.

The object of the invention is further to provide a machine of the class set forth which can be easily operated to rapidly set lacing hooks simultaneously in the opposite edges of the upper of a boot or shoe.

The invention consists in the combination and arrangement of parts set forth in the following specification and particularly pointed out in the claims thereof.

Figure 1:
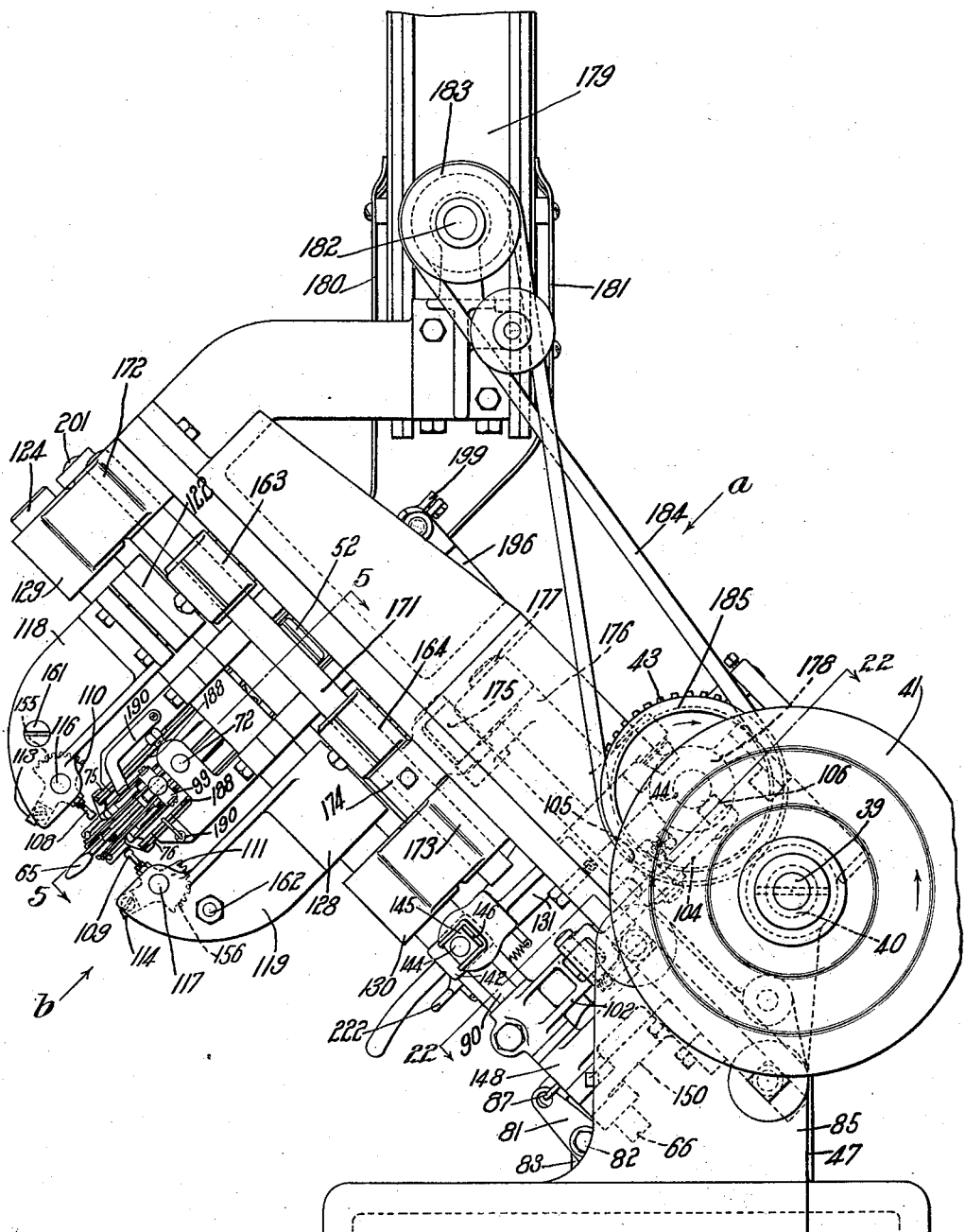
Figure 2:
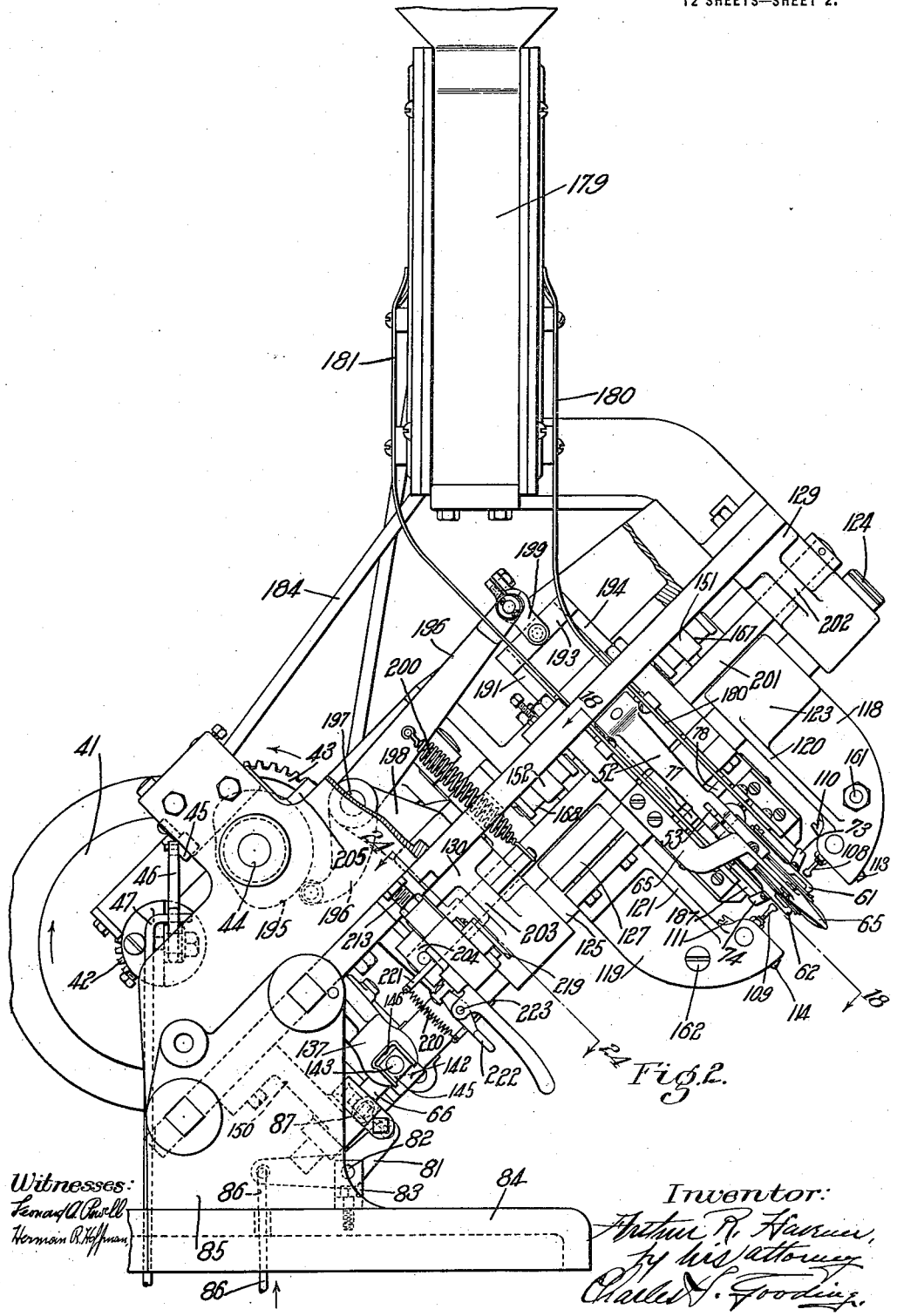
Figure 3:
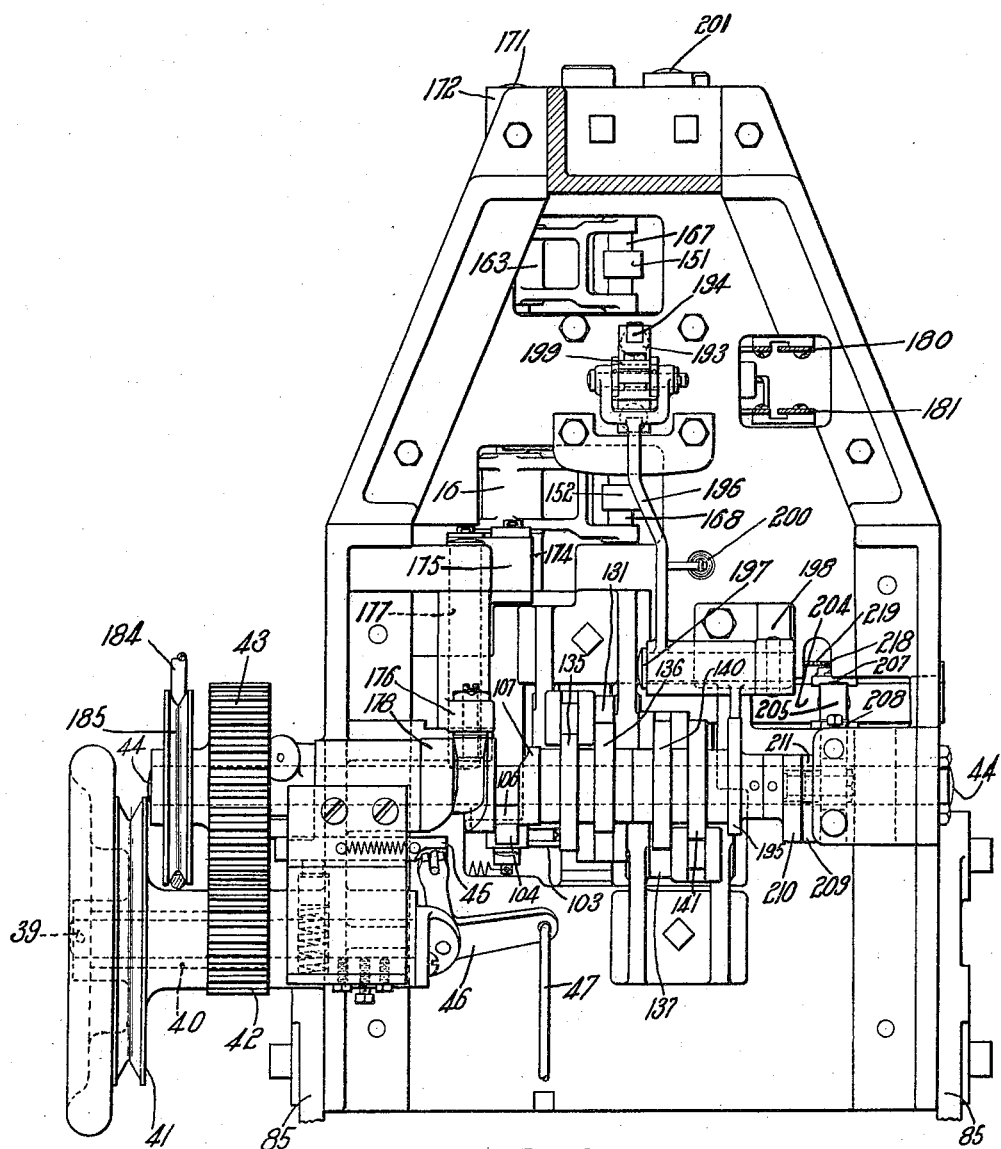
Figure 10:
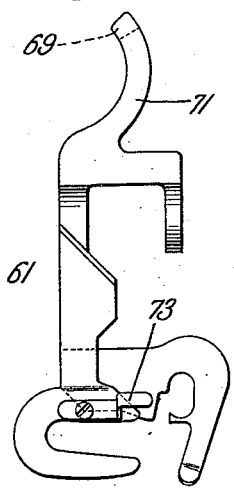
Figure 11:
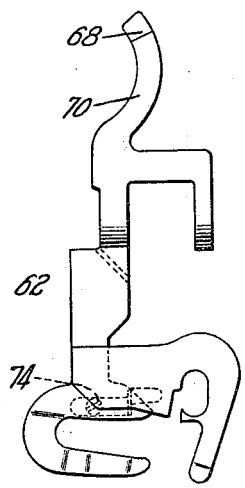
Figure 12:
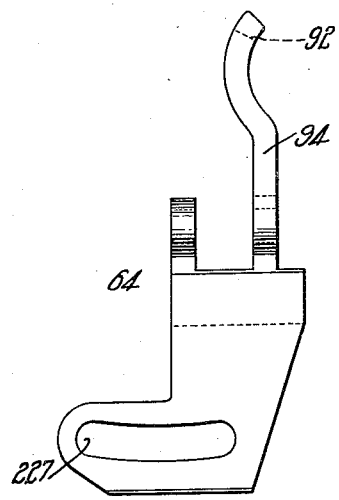
Figure 14:
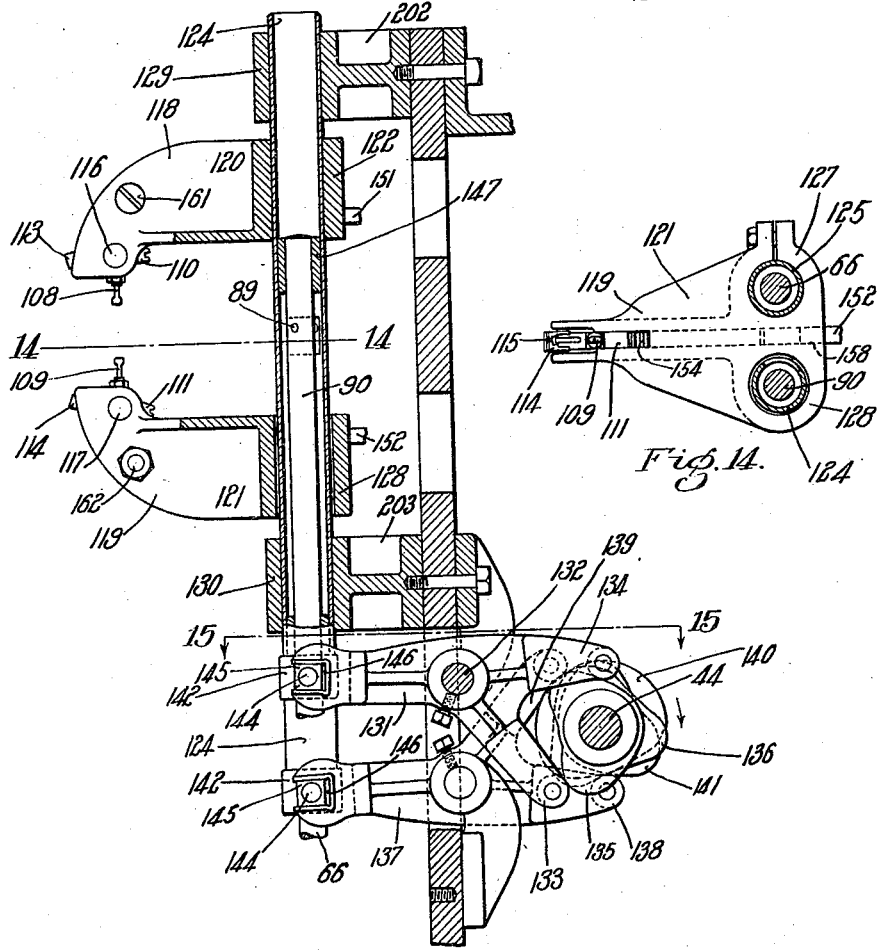
Figure 13:
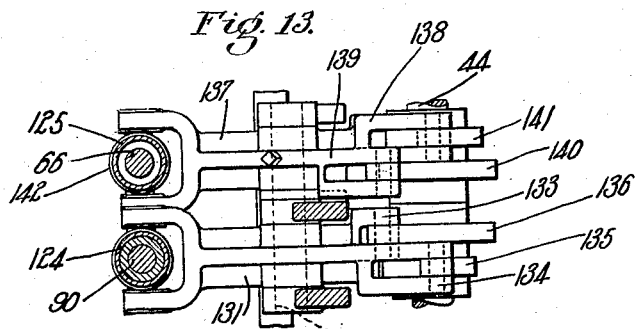
Figure 15:
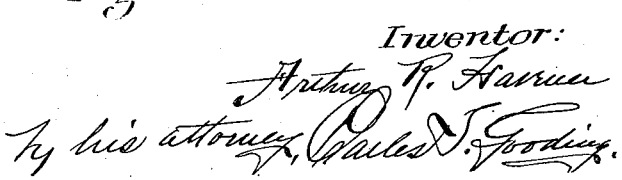
Figures 24, 25, 26, 27:
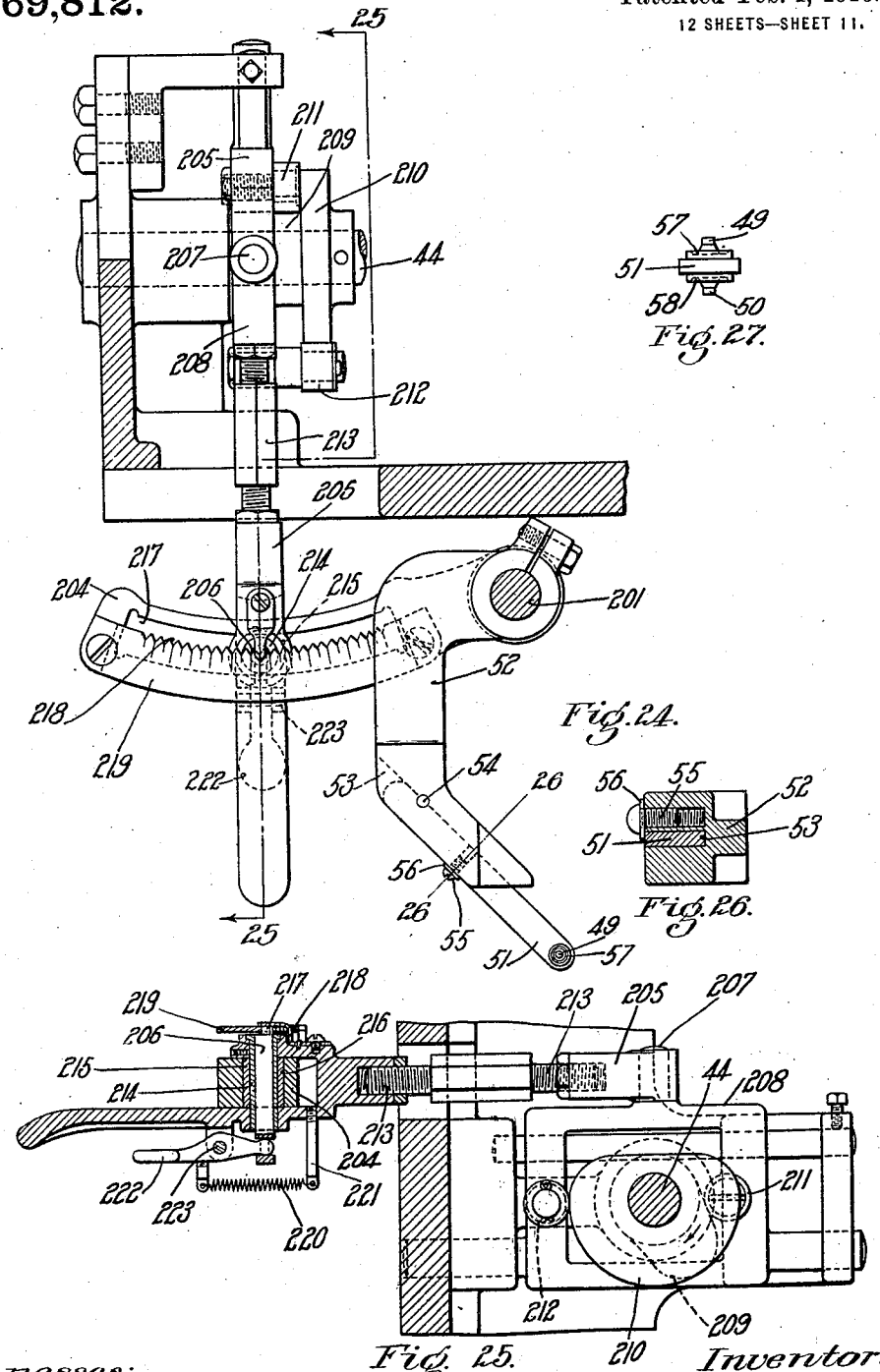

Referring to the drawings: Figure 1 is a right hand side elevation of my improved lacing hook double set machine. Fig. 2 is a left hand side elevation of the same. Fig. 3 is a rear elevation, partly in section, viewed in the direction of the arrow $a$ (Fig. 1). Fig. 4 is a front elevation, partly in section, viewed in the direction of the arrow $b$ (Fig. 1). Fig. 5 is a sectional plan taken on line 5—5 of Fig. 1. Fig. 5$^a$ is a front elevation of the edge guides and their support showing the same in connection with portions of the stripper levers which are shown in section. Fig. 6 is a sectional elevation taken on line 6—6 Fig. 5. Fig. 7 is a detail end elevation of the upper presser foot lever. Fig. 8 is a detail end elevation of the upper stripper lever. Fig. 9 is a perspective view of the work positioning members, including the presser foot and stripper levers. Fig. 10 is a plan view of the upper presser foot lever. Fig. 11 is a plan view of the lower presser foot lever. Fig. 12 is a plan view of the lower stripper lever. Fig. 13 is a sectional elevation of the mechanism for reciprocating the punching dies and lacing hook carriers taken on line 13—13 of Fig. 4. Fig. 14 is a sectional plan taken on line 14—14 of Fig. 13. Fig. 15 is a sectional plan taken on line 15—15 of Fig. 13. Fig. 16 is a sectional elevation taken on line 16—16 of Fig. 4. Fig. 17 is a sectional plan of the punch and set and the mechanism for rocking the holder which carries the punching die and lacing hook carrier, the same being shown broken away to save space. Fig. 18 is a sectional plan taken on line 18—18 of Fig. 2. Fig. 19 is a sectional plan similar to Fig. 18 showing the parts in different positions relatively to each other. Fig. 20 is a sectional elevation taken on line 20—20 of Fig. 18. Fig. 21 is a detail sectional elevation taken on line 21—21 of Fig. 18. Fig. 22 is a sectional elevation taken on line 22—22 of Fig. 1, showing the mechanism for rocking the shafts which operate the stripper and presser foot levers. Fig. 23 is a sectional elevation taken on line 23—23 of Fig. 22. Fig. 24 is a sectional plan taken on line 24—24, Fig. 2 showing the mechanism for feeding the work. Fig. 25 is a sectional elevation taken on line 25—25 of Fig. 24. Fig. 26 is a detail section taken on line 26—26 of Fig. 24. Fig. 27 is a front elevation of the punches and anvils showing them attached to their supporting lever. Fig. 28 is a detail side elevation of the different parts illustrating the manner in which the work is held when first put in the machine and the relative positions of the punches and punching dies, the stripper levers and the presser feet in relation thereto. Figs. 29, 30, 31, 32 and 33 are views similar to Fig. 28 showing the parts in different positions relatively to each other and illustrating the different positions assumed by said parts during the different steps in the operation of punching the stock, setting the lacing hooks therein, feeding the stock and stripping the stock off of the punches after the feeding operation is completed.

Like numerals refer to like parts throughout the several views of the drawings.

In the drawings, 39 is a stationary shaft (see Fig. 3) upon which is journaled a sleeve 40 driven by a pulley 41. A pinion 42 is fast to the sleeve 40 and meshes into a gear 43 forming one member of a clutch which is thrown into and out of locking engagement with a cam shaft 44 in a manner well known to those skilled in this art by means of a clutch slide 45 which is operated by means of a lever 46 which, in turn, is operated by a treadle rod 47 and treadle, the latter not being shown in the drawings. The shaft 44 has a series of cams thereon for operating the different mechanisms which will now be described.

In operating the machine the upper 48 of a shoe in which the lacing hooks are to be driven adjacent to the opposite edges of said upper is doubled over by the operator to bring the two edges of the upper in alinement with each other and the upper is then placed on the machine ready to be punched and to have lacing hooks set therein in the position illustrated in Fig. 28. The inner faces of the flaps are positioned adjacent to two oppositely disposed punches 49 and 50 which are fastened to or made integral with an arm 51 which is detachably fastened to and forms a part of a lever 52. The arm 51 is placed in a slot 53 formed in the lever 52 and is positioned longitudinally thereof in said slot by a dowel pin 54. Said arm 51 is held in the slot 53 by a screw 55 having screw-threaded engagement with the lever 52 and by a washer 56 which projects over the outer edge of the arm 51 and is clamped thereto by said screw 55. This construction enables the operator to quickly remove the arm 51 with the punches 49 and 50 thereunto attached or integral therewith, as the case may be, and substitute for said arm another arm with punches of diameters or lengths different from the punches 49 and 50, so that the machine may readily be adapted to punch and set larger shank lacing hooks or to set lacing hooks in thin or thick material, and thus the punches and anvils for any reason whatsoever may be readily changed.

At the bases of the punches 49 and 50 annular anvils 57 and 58, concentric with said punches, are provided which operate to clench the stem of the lacing hook in the upper. The punches 49 and 50, it will be seen, are arranged to point away from each other.

The flaps 59 and 60 of the upper are positioned relatively to the punches and anvils when they are first inserted in the machine by the operator, by a pair of presser foot levers 61 and 62 and a pair of stripper levers 63 and 64 (see Figs. 6 to 12 inclusive).

A stationary guide plate 65 is fastened to the frame of the machine and acts as a means to assist in guiding the flaps of the upper to the positioning levers and stripper levers when the upper is first placed in the machine, after which said guide plate performs no function. It will be noted that said guide plate is located at one side of the punching and setting mechanisms, as clearly shown in Fig. 5. When the flaps 59 and 60 of the upper are first inserted in the machine to be positioned correctly with relation to the punches prior to the punching and setting operation, the presser foot levers 61 and 62 are moved away from each other and from the stripper levers 63 and 64 to allow the insertion of said flaps between the presser foot levers and the stripper levers by rocking a shaft 66 (Fig. 5). Said shaft 66 has a projection preferably formed of a pin 67 fast thereto and projecting between the beveled ends 68 and 69 of the presser foot levers 61 and 62, respectively, said beveled ends 68 and 69 being provided upon the rearwardly extending arms 70 and 71 of said levers 61 and 62, respectively. The presser foot levers 61 and 62 are pivoted to a shaft 72 which is fastened to the frame of the machine and at their forward ends said levers are provided with arms 73 and 74 fast thereto. These arms are normally held against stops 75 and 76 (which are fast to the frame of the machine) by pins 77 and 78 which are held in engagement with the arms 70 and 71 by springs 79 and 80. It will be evident that as the shaft 66 is rocked the pin 67 projecting between the beveled ends of the presser foot levers 61 and 62 will cause said levers to move apart or allow them to move toward each other according to the direction in which said shaft is rocked.

The shaft 66 is rocked by the mechanism illustrated in Figs. 2 and 22 and consists of a lever 81 pivoted at 82 to a bracket 83 fast to the base 84 of the frame 85. The lever 81 is rocked by a rod 86 which is operated by means of a treadle (not shown in the drawings). Said lever is connected by a link 87 to an arm 88 fast to the rock-shaft 66.

The stripper levers 63 and 64 are rocked toward and away from each other by means of a projection, preferably in the form of a pin 89 fast to a vertical rock-shaft 90 and engaging the beveled ends 91 and 92 of the rearwardly extending arms 93 and 94 forming a part of the stripper levers 63 and 64, respectively. Said beveled ends 91 and 92 are held in engagement with the pin 89 by pins 95 and 96 which are fastened to spring arms 97 and 98 which are fastened, in turn, to a block 99, said block being adjustable on a horizontal pin 100 and locked to said pin in adjusted position by a set-screw 101.

The spring actuated pins 95 and 96 bear against the upper and lower surfaces, respectively, of the stripper levers 63 and 64 and tend to move said levers toward each other at their forward ends and to hold the beveled ends 91 and 92 of the rearwardly extending portions of said levers in contact with the pin 89 on the rock-shaft 90. Said spring pins 95 and 96 form edge guides for the flaps 59 and 60, respectively, of the upper 48.

A rocking motion is imparted to the shaft 90 by the mechanism illustrated in Figs. 22 and 23 and consists of an arm 102, link 103, lever 104 pivoted to a stud 105 fast to the frame of the machine and provided with a cam roll 106 which is arranged to engage a cam 107 fast to the cam shaft 44. It will thus be seen that the position of the stripper levers and the presser foot levers relatively to each other and to the punches is regulated by the mechanisms hereinbefore described, the general operation of which will be more fully hereinafter set forth.

The holes in the flaps of the upper are punched by the punches 49 and 50 which coöperate, respectively, with punching dies 108 and 109 (Figs. 16 and 17) which are fastened to and project radially from holders 110 and 111. The punching dies 108 and 109 are preferably formed with holes 112 therein to receive the material punched out of the uppers, these holes being of less diameter than the diameter of the punches 49 and 50 respectively and operating in accordance with my U. S. Patent No. 977,090, issued to me November 29, 1910.

On the holders 110 are provided radially extending arms, constituting lacing hook carriers, 113 and 114, said carriers being provided with suitably shaped recesses 115 to receive the heads of the lacing hooks which it is desired to drive into the upper. The holders 110 and 111 are rotatably mounted upon studs 116 and 117 which are fast to arms 118 and 119, said arms forming portions of brackets 120 and 121.

The bracket 120 is provided with two bosses 122 and 123. (Fig. 4.) The boss 122 is clamped to a vertically extending cylindrical slide 124, while the boss 123 is mounted loosely upon and arranged to slide upon a cylindrical slide 125, this construction being provided to keep the arm 118 with its punching die and lacing hook carrier in proper alinement. The arm 119 is similar in its construction to that of the arm 118 and forms a portion of a bracket 121 which has two bosses 127 and 128 thereon. The boss 127 is clamped to the slide 125. The boss 128 is loosely mounted on the slide 124 so as to slide thereon.

A reciprocatory motion is imparted to the cylindrical slides 124 and 125, in order to move the punching dies 108 and 109 toward and away from each other and thus perform the punching operation in conjunction with the punches 49 and 50, by the mechanism illustrated in Figs. 13 and 15, wherein it will be seen that the slide 124, which is shown in section in Fig. 13, is slidable in brackets 129 and 130 fast to the frame of the machine and has a reciprocatory motion imparted thereto by a lever 131 pivoted at 132 to the frame of the machine, said lever being provided with two arms 133 and 134 having cam rolls thereon which engage, respectively, cams 135 and 136. The slide 125 has a vertical reciprocatory motion imparted thereto by a lever 137 which also has two arms 138 and 139 thereon provided with cam rolls engaging cams 140 and 141.

The manner in which the lever 137 is connected to the cylindrical slide 125 is clearly shown in section in Fig. 4 and in side elevation in Fig. 13, to which reference will now be had. Both of the circular slides 124 and 125 are made preferably of tubing and in the lower end of the tube 125 is driven a plug 142 which has journal pins 143 and 144 on its opposite sides. These journal pins project into sliding blocks 145 which project into slots 146 in the jaws of the bifurcated lever 137. The lever 131 is connected to the slide 124 in a similar manner.

It will be noted that the rock-shaft 90 is journaled at its upper end (see Fig. 13) in a bearing sleeve 147 located in the interior of the tubular slide 124, while the lower end of said shaft 90 rocks in a bearing 148 in a bracket 149 which is fastened to the frame of the machine (see Figs. 22 and 23). The rock-shaft 66 is similarly mounted in a sleeve provided in the interior of the slide 125 (not shown in the drawings), its lower end being mounted to rock in a bracket 150 fast to the frame of the machine (Fig. 22).

It will be seen that the mechanism hereinbefore described is constructed and arranged to impart a reciprocatory motion to the tubular slides 124 and 125, thus causing the punching dies to move toward each other and causing the two flaps 59 and 60 to be forced on to the punches 49 and 50, respectively. The slides 124 and 125 are then operated to move the punching dies away from each other and the holders 110 and 111 are then rocked to bring the lacing hook carriers 113 and 114 into the position formerly occupied by the punching dies. Said carriers are rocked simultaneously by reciprocatory slides 151 and 152 which have racks 153 and 154 formed thereon. Said racks mesh into segmental gears 155 and 156 formed on the holders 110 and 111. Said slides 151 and 152 are guided at their rear ends by ways 157 and 158 on the brackets 120 and 121 respectively, and at their front ends are held in engagement with the segment gears by blocks 159 and 160 which are mounted upon eccentric studs 161 and 162, said studs being, in turn, rotatably mounted in the arms 118 and 119 and locked in adjusted position by suitable lock nuts. These eccentric studs can be rotated in the proper direction to cause the racks 153 and 154 to mesh properly into their respective segment gears and can also be rotated to take up any wear that may take place in the machine, thus insuring a firm engagement of said racks with their gears and preventing lost motion in the holders 110 and 111. Said slides 151 and 152 have a reciprocatory motion imparted thereto by levers 163 and 164, respectively, and are connected to said levers by pins 165 and 166 which pass through sliding blocks 167 and 168 slidable in slots 169 and 170 formed in the ends of the slides 151 and 152 (see Figs. 1, 16 and 17).

The levers 163 and 164 are fastened to a shaft 171 which has suitable bearings in the frame of the machine at 172 and 173. A rocking motion is imparted to said shaft 171 by an arm 174 (Figs. 1 and 17) which is connected by a link 175 to a cam lever 176 pivoted at 177 and rocked by a cam 178 fast to the cam shaft 44.

When the lacing hook carriers 113 and 114 have been rocked from the position illustrated in full lines (Fig. 16) to the position shown in dotted lines therein a lacing hook is inserted in each of the lacing hook recesses 115 formed in said carriers by mechanism which will now be described.

The lacing hooks are placed in a suitable hopper or hoppers 179 and are fed from said hoppers by suitable rotary feeding mechanism, well known to those skilled in this art, to the raceways 180 and 181 (Figs. 1, 2 and 18). The rotary member of the hoppers is fast to a shaft 182 which is rotated by a pulley 183, belt 184 and pulley 185, said pulley 185 being fastened to the hub of the gear 43. The lacing hooks are delivered from the hoppers to said raceways 180 and 181 and descend said raceways to the lower ends thereof (see Fig. 2). The lower ends of the raceways are substantially alike and in Figs. 18, 19 and 20 the operation of transferring a lacing hook from the lower raceway 181 to the lower lacing hook carrier 114 is illustrated and the description of the manner in which a lacing hook is transferred from the lower raceway will apply to the manner in which a lacing hook is transferred from the raceway 180 to the lacing hook carrier 113.

Referring, then, to Figs. 18, 19 and 20, it will be seen that the lowermost lacing hook passes from the foot of the main raceway 181 to the auxiliary raceway 186 formed of a stationary part 187 and a spring-actuated pivoted part 188. Said part 188 is pivoted at 189 to the frame of the machine and is held toward the part 187 by a spring 190. Details of this portion of the mechanism form a part of an invention which is made the subject matter of a separate application filed by me May 29, 1914, Serial No. 841,932, and operates in substantially the same way, no claim being made in this case to the details of construction of the raceway. The lowermost lacing hook is fed along the auxiliary raceway and into the recess provided therefor in its respective lacing hook carrier 114 by a slide 191 which has a finger 192 fast thereto and arranged to engage the neck of the lacing hook and push it along the auxiliary raceway and onto the carrier 114. The slide 191 is guided in suitable ways in the frame of the machine and is fastened at its rear end to a cross-bar 193 (Fig. 2), the other end of the cross-bar being fastened to another slide 194 which operates to feed lacing hooks from the raceway 180 into the recess provided therefor in the lacing hook carrier 113.

A reciprocatory motion is imparted to the slides 191 and 194 by a cam 195 (Fig. 2) which operates a lever 196 pivoted to rock on a stud 197 fast to a bracket 198 on the frame of the machine. The upper end of the lever 196 is connected by a link 199 to the cross-bar 193. Said lever 196 is provided with a cam roll which is held in engagement with the periphery of the cam 195 by a spring 200. After a lacing hook has been fed, as hereinbefore described, to each of the lacing hook carriers 113 and 114, said lacing hook carriers are brought toward each other to set the lacing hooks in the stock and clench said lacing hooks on the anvils 57 and 58, respectively, by means of the slides 124 and 125. Then, after the lacing hooks are set the lacing hook carriers are rocked by the mechanism hereinbefore described to disengage the carriers from the lacing hooks and said lacing hooks, together with the stock in which they have been set and clenched, are fed by the punches 49 and 50 which are in engagement with said lacing hooks by means of the arm 52 which is fastened to a rock-shaft 201 suitably mounted to rock in bearings 202 and 203 (Fig. 2). An arm 204 Figs. 24 and 25 is fastened to the lower end of said rock-shaft and a rocking motion is imparted to said arm by a link 205 which is pivoted to said arm by a slidable pin 206, the other end of said arm being pivoted at 207 to a slide 208. A reciprocatory motion is imparted to the slide 208 by cams 209 and 210 fast to the cam shaft 44, which cams engage rolls 211 and 212, respectively, said rolls being rotatably mounted upon the slide 208. The link 205 is provided with a right and left adjusting screw 213, whereby the position of the lever arm 52 and, therefore, of the punches may be adjusted.

The punches always return to the same initial position, but it is desirable that the mechanism which operates them to feed the stock should be capable of adjustment so as to move said punches from said initial position a greater or less extent according to the distance apart which it is desired to have the lacing hooks set in the upper, and to obtain this result the link 205 can be swung on its pivot 207 to different positions and locked to the arm 204 by means of the slidable pin 206 which passes through a sleeve 214 in a sliding block 215, the sliding block 215 being located in a curved slot 216 provided in the arm 204, said slot being concentric with the pivot 207 when the arms 204 and 52 are in the proper position to locate the punches in their initial position.

The upper end of the pin 206 is provided with a tooth 217 which engages any one of the teeth 218 provided on a plate 219 fast to the arm 204. The pin 206 is kept in a raised position and in engagement with the teeth 218 by a spring 220 which is connected at one end to a pin 221 and at the other end to a lever 222. The lever 222 is pivoted at 223 to the link 205 and engages the pin 206 so that by operating the lever 222 the tooth 217 may be disengaged from the teeth 218 and by releasing said lever 222 said pin will be moved upwardly until said tooth 217 engages said teeth again. Thus the link 205 is locked to the arm 204 in any desired position and, therefore, a greater or less throw may be imparted to the arm 52 and to the punches as may be desired, thus changing the extent to which the stock is fed by said punches and the distance between the lacing hooks set in the upper. The particular mechanism for changing the throw of the arm 52 is substantially the same as the mechanism shown and described in my U. S. Letters Patent No. 1,032,479, dated July 16, 1912.

The general operation of the double set lacing hook machine hereinbefore specifically described is as follows: First, the operator places his foot on the treadle and pushes upwardly upon the rod 86 (Fig. 2), thus tipping the lever 81 and through the link 87 (Fig. 22) the arm 88 is rocked, thus rocking the shaft 66 to which the projecting pin 67 is fastened. Said pin engages the beveled ends 68 and 69 of the presser foot levers 61 and 62, respectively, and as said pin 67 is rocked said presser foot levers will be moved away from each other and from the stripper levers 63 and 64. The operator doubles the upper so as to bring the opposing edges thereof substantially in line with each other and inserts the flaps 59 and 60 of the upper between the presser foot levers 61 and 62 and the stripper levers 63 and 64 respectively, with the edges of said flaps bearing against the edge guide pins 95 and 96. He then releases the treadle and the presser foot levers will be returned by their spring actuated pins 77 and 78 to the position illustrated in Fig. 28. At this time the punches 49 and 50 are positioned relatively to said upper as illustrated in Fig. 28, the inner surfaces of the upper being substantially flush with the ends of the punches. The flaps 59 and 60 are now clamped between the presser foot levers and the stripper levers. The operator then rocks the treadle in the opposite direction to that in which he rocked it in order to open the two presser foot levers and thus pulls downwardly upon the clutch rod 47, operating the clutch lever 46 and clutch slide 45 to cause the gear 43 to be locked to the cam shaft 44. The machine will then begin its automatic operation. The punching dies 108 and 109 are now caused to approach each other by the reciprocatory slides 124 and 125 and the flaps 59 and 60 are forced onto the punches 49 and 50, as illustrated in Fig. 29. At the same time that the punching dies are forcing the flaps onto the punches the rock-shaft 90 is rocked in the proper direction to allow the stripper levers to be moved toward each other by the spring actuated edge guide pins 95 and 96.

The rocking of the pin 89 and rock-shaft 90 is accomplished by the mechanism illustrated in Figs. 22 and 23, consisting of the arm 102, link 103, lever 104 and cam 107. The parts assume the relative positions illustrated in Fig. 29 in which it will be seen that the flaps 59 and 60 have been driven onto the punches and the stripper levers have been caused to approach each other and are located just inside the inner faces of the flaps 59, 60.

The next step in the operation consists in the punching dies 108 and 109 being drawn away from each other, and the holders 110 and 111 are moved away from each other and given a quarter rotation by the reciprocatory rack slides 151 and 152 to bring the lacing hook carriers 113 and 114 into alinement with each other and into the positions formerly occupied by the punching dies 108 and 109. The rocking of the holders 110 and 111 is accomplished by mechanism illustrated in Figs. 16 and 17 and consisting of the racks 153 and 154, slides 151 and 152, arms 163 and 164, rock-shaft 171, arm 174, link 175, cam lever 176 and cam 178. The parts have now been moved to the relative positions illustrated in Fig. 30.

In the next step in the operation the lacing hooks 224 and 225 (Fig. 30) are pushed into the recesses 115 in the carriers 113 and 114. Said hooks are pushed onto their respective carriers by the mechanism illustrated in Figs. 2, 18, 19 and 20 and consisting of the slides 191 and 194, lever 196 and cam 195. The holders are now brought toward each other a second time and the shanks of the lacing hooks 224 and 225 are forced through the flaps 59 and 60 onto the punches 49 and 50 and into engagement with the anvils 57 and 58 and are thus clenched in the flaps 59 and 60, as illustrated in Fig. 31.

The next step in the operation consists in rocking the holders 110 and 111 a second time to remove said lacing hook carriers from their respective hooks, as illustrated in Fig. 32. The lacking hooks are now set in the flaps of the upper and the upper, together with said lacing hooks, is free to be fed by the punches. This is accomplished by means of the mechanism illustrated in Figs. 24 and 25 and consisting of the arm 51, to which the punches are directly attached, the arm 52 to which said arm 51 is fastened, the arm 204, link 205, slide 208 and cams 209 and 210. It will be understood that the upper is fed with the punches projecting into the shanks of the lacing hooks which are already set in said upper and said lacing hooks and punches move along in the slots 226 and 227 provided in the stripper levers 63 and 64, respectively. When the feed arm 51 has arrived at the limit of its movement and the stock has been fed, as hereinbefore described, the upper will have been fed the distance required between two adjacent hooks and during this time the holders 110 and 111 will be moved upwardly and rocked to assume the relative positions illustrated in Fig. 28, ready to again punch holes in the two flaps of the upper.

As soon as the feeding movement of the upper has been completed the flaps 59 and 60 will be removed from the punches 49 and 50 by the stripper levers 63 and 64 which will be moved away from each other to remove the flaps 59 and 60 and the lacing hooks 224 and 225 from the punches (Fig. 33) 49 and 50 by the mechanism illustrated in Figs. 5, 6, 7, 8 and 9 as follows: The pin 89 will be rocked by the rock-shaft 90 to spread the arms 93 and 94 of the stripper levers 63 and 64 apart, rocking them on their pivot 72 and moving them apart to remove the flaps and lacing hooks set therein from the punches. At the same time that these levers are moved apart the pins 95 and 96 will be moved apart and the levers 63 and 64 will bring the flaps 59 and 60 into engagement with the presser foot levers 61 and 62, thus clamping the flaps 59 and 60 between the stripper levers and the presser foot levers preparatory to the return of the punches to their initial position illustrated in Fig. 28 ready to have new holes punched in the upper and new lacing hooks set in said holes. Thus, it will be seen that the upper is clamped between the stripper levers and the presser foot levers while the stock is being punched and while the punches are returning to their initial position after having fed the stock and that the presser foot levers, during the feeding of the stock, do not clamp the stock to the stripper levers, but are positioned by means of the spring pins 77 and 78, with the arms 73 and 74 resting against the stops 75 and 76, so that while not clamping the stock as it is being fed they remain in position to prevent the stock from accidentally becoming detached from the punches during the feeding movement and the series of operations hereinbefore described is repeated until the requisite number of lacing hooks are set in the flaps of the upper, whereupon the operator releases the clutch treadle, the clutch is thrown out of operation and the machine stops, with the parts in the relative positions illustrated in the main views of the drawings and in Figs. 5 and 6.

Having thus described my invention, what I claim and desire by Letters Patent to secure is:

1. A machine for setting lacing hooks in the upper of a boot or shoe having, in combination, a pair of oppositely disposed punching dies, a pair of punches and a pair of anvils interposed between said punching dies and arranged to coact therewith and mechanism constructed and arranged to move said dies toward and away from each other, whereby when two flaps of said upper are inserted, one between each die and its respective punch, a hole will be punched in each of said flaps, and mechanism constructed and arranged to drive a lacing hook onto each of said punches and into said holes.

2. A machine for setting lacing hooks in the upper of a boot or shoe having, in combination, a pair of oppositely disposed punching dies, a pair of punches and a pair of anvils interposed between said punching dies and arranged to coact therewith, mechanism constructed and arranged to move said dies toward and away from each other, whereby when two flaps of said upper are inserted, one between each die and its respective punch, a hole will be punched in each of said flaps and said flaps will be forced onto said punches, mechanism constructed and arranged to drive a lacing hook onto each of said punches and into each of said holes, and means constructed and arranged to remove said flaps with said lacing hooks from said punches.

3. A machine for setting lacing hooks in the upper of a boot or shoe having, in combination, a pair of oppositely disposed punching dies, a pair of punches and a pair of anvils interposed between said punching dies and arranged to coact therewith, mechanism constructed and arranged to move said dies toward and away from each other, whereby when two flaps of said upper are inserted, one between each die and its respective punch, a hole will be punched in each of said flaps and said flaps will be forced onto said punches, mechanism constructed and arranged to drive a lacing hook onto each of said punches and into each of said holes, and means constructed and arranged to move said punches laterally thereof whereby said upper may be fed.

4. A machine for setting lacing hooks in the upper of a boot or shoe having, in combination, a pair of oppositely disposed punching dies, a pair of punches and a pair of anvils interposed between said punching dies and arranged to coact therewith, mechanism constructed and arranged to move said dies toward and away from each other, whereby when two flaps of said upper are inserted, one between each die and its respective punch, a hole will be punched in each of said flaps and said flaps will be forced onto said punches, mechanism constructed and arranged to drive a lacing hook onto each of said punches and into each of said holes, means constructed and arranged to move said punches laterally thereof whereby said upper may be fed, and means constructed and arranged to remove said flaps from said punches.

5. A machine for setting lacing hooks in the upper of a boot or shoe having, in combination, a pair of oppositely disposed punching dies, a pair of punches and a pair of anvils interposed between said punching dies and arranged to coact therewith, mechanism constructed and arranged to move said dies toward and away from each other, whereby when two flaps of said upper are inserted, one between each die and its respective punch, a hole will be punched in each of said flaps and said flaps will be forced onto said punches, mechanism constructed and arranged to drive a lacing hook onto each of said punches and into each of said holes, means constructed and arranged to move said punches and lacing hooks laterally thereof whereby said upper may be fed, means arranged to hold said flaps and lacing hooks on their respective punches during the feeding movement and means constructed and arranged to subsequently remove said flaps and lacing hooks from said punches.

6. A machine for setting lacing hooks in the upper of a boot or shoe having, in combination, a pair of punches, a pair of anvils concentric with said punches, a pair of punching dies and a pair of lacing hook carriers, said punches and anvils being interposed between said dies and carriers, mechanism constructed and arranged to alternately move said dies and carriers into and out of alinement with said punches and anvils, and mechanism constructed and arranged to move said dies and carriers toward and away from said punches and anvils, whereby when two flaps of said upper are inserted, one between each die and its respective punch, said flaps will be forced onto said punches and a lacing hook set in each flap.

7. A machine for setting lacing hooks in the upper of a boot or shoe having, in combination, a pair of punches, a pair of anvils concentric with said punches, a pair of punching dies and a pair of lacing hook carriers, said punches and anvils being interposed between said dies and carriers, mechanism constructed and arranged to alternately move said dies and carriers into and out of alinement with said punches and anvils, mechanism constructed and arranged to move said dies and carriers toward and away from said punches and anvils, whereby when two flaps of said upper are inserted, one between each die and its respective punch, said flaps will be forced onto said punches and a lacing hook set in each flap, and means constructed and arranged to remove said flaps and said lacing hooks from said punches.

8. A machine for setting lacing hooks in the upper of a boot or shoe having, in combination, a pair of punches, a pair of anvils concentric with said punches, a pair of punching dies and a pair of lacing hook carriers, said punches and anvils being interposed between said dies and carriers, mechanism constructed and arranged to alternately move said dies and carriers into and out of alinement with said punches and anvils, mechanism constructed and arranged to move said dies and carriers toward and away from said punches and anvils, whereby when two flaps of said upper are inserted, one between each die and its respective punch, said flaps will be forced onto said punches and a lacing hook set in each flap and means constructed and arranged to move said punches laterally thereof, whereby said upper may be fed.

9. A machine for setting lacing hooks in the upper of a boot or shoe having, in combination, a pair of punches, a pair of anvils concentric with said punches, a pair of punching dies and a pair of lacing hook carriers, said punches and anvils being interposed between said dies and carriers, mechanism constructed and arranged to alternately move said dies and carriers into and out of alinement with said punches and anvils, mechanism constructed and arranged to move said dies and carriers toward and away from said punches and anvils, whereby when two flaps of said upper are inserted, one between each die and its respective punch, said flaps will be forced onto said punches and a lacing hook set in each flap, means constructed and arranged to move said punches laterally thereof, whereby said upper may be fed, and means constructed and arranged to remove said flaps from said punches.

10. A machine for setting lacing hooks in the upper of a boot or shoe having, in combination, a pair of punches, a pair of anvils concentric with said punches, a pair of punching dies and a pair of lacing hook carriers, said punches and anvils being interposed between said dies and carriers, mechanism constructed and arranged to alternately move said dies and carriers into and out of alinement with said punches and anvils, mechanism constructed and arranged to move said dies and carriers toward and away from said punches and anvils, whereby when two flaps of said upper are inserted, one between each die and its respective punch, said flaps will be forced onto said punches and a lacing hook set in each flap, means arranged to hold said flaps on their respective punches during the feeding movement and means constructed and arranged to subsequently remove said flaps from said punches.

11. A double set lacing hook machine having, in combination, a pair of punches, a pair of anvils concentric with said punches, a pair of holders, a punching die and a lacing hook carrier on each of said holders, said punches and anvils being interposed between said holders, mechanism constructed and arranged to rock said holders to alternately move said dies and carriers into and out of alinement with said punches and anvils and mechanism constructed and arranged to move said dies and carriers toward and away from said punches and anvils, whereby when two flaps of an upper are inserted, one between each die and its respective punch, said flaps will be forced onto said punches and a lacing hook set in each flap.

12. A double set lacing hook machine having, in combination, a pair of punches, a pair of anvils concentric with said punches, a pair of holders, a punching die and a lacing hook carrier on each of said holders, said punches and anvils being interposed between said holders, mechanism constructed and arranged to rock said holders to alternately move said dies and carriers into and out of alinement with said punches and anvils, mechanism constructed and arranged to move said dies and carriers toward and away from said punches and anvils, whereby when two flaps of an upper are inserted, one between each die and its respective punch, said flaps will be forced onto said punches and a lacing hook set in each flap and means constructed and arranged to remove said flaps and lacing hooks from said punches.

13. A double set lacing hook machine having, in combination, a pair of punches, a pair of anvils concentric with said punches, a pair of holders, a punching die and a lacing hook carrier on each of said holders, said punches and anvils being interposed between said holders, mechanism constructed and arranged to rock said holders to alternately move said dies and carriers into and out of alinement with said punches and anvils, mechanism constructed and arranged to move said dies and carriers toward and away from said punches and anvils, whereby when two flaps of an upper are inserted, one between each die and its respective punch, said flaps will be forced onto said punches and a lacing hook set in each flap and means constructed and arranged to move said punches laterally thereof, whereby said upper may be fed.

14. A double set lacing hook machine having, in combination, a pair of punches, a pair of anvils concentric with said punches, a pair of holders, a punching die and a lacing hook carrier on each of said holders, said punches and anvils being interposed between said holders, mechanism constructed and arranged to rock said holders to alternately move said dies and carriers into and out of alinement with said punches and anvils, mechanism constructed and arranged to move said dies and carriers toward and away from said punches and anvils, whereby when two flaps of an upper are inserted, one between each die and its respective punch, said flaps will be forced onto said punches and a lacing hook set in each flap, means constructed and arranged to move said punches laterally thereof, whereby said upper may be fed, and means constructed and arranged to remove said flaps from said punches.

15. A double set lacing hook machine having, in combination, a pair of punches, a pair of anvils concentric with said punches, a pair of holders, a punching die and a lacing hook carrier on each of said holders, said punches and anvils being interposed between said holders, mechanism constructed and arranged to rock said holders to alternately move said dies and carriers into and out of alinement with said punches and anvils and mechanism constructed and arranged to move said dies and carriers toward and away from said punches and anvils, whereby when two flaps of an upper are inserted, one between each die and its respective punch, said flaps will be forced onto said punches and a lacing hook set in each flap, means arranged to hold said flaps on their respective punches during the feeding movement and means constructed and arranged to subsequently remove said flaps from said punches.

16. A double set lacing hook machine having, in combination, a pair of punches, a pair of anvils concentric with said punches, a pair of holders, a punching die and a lacing hook carrier on each of said holders, said punches and anvils being interposed between said holders, gear teeth on each of said holders, racks meshing into said gear teeth and mechanism constructed and arranged to impart a reciprocatory motion to said racks to alternately move said dies and carriers into and out of alinement with said punches and anvils and mechanism constructed and arranged to move said dies and carriers toward and away from said punches and anvils whereby when two flaps of an upper are inserted, one between each die and its respective punch, said flaps will be forced onto said punches and a lacing hook set in each flap.

17. A lacing hook setting machine having, in combination, a punch and anvil, a holder, a punching die on said holder, a lacing hook carrier on said holder, mechanism constructed and arranged to rock said holder to alternately move said die and carrier into and out of alinement with said punch and anvil and mechanism constructed and arranged to move said holder toward and away from said punch and anvil, whereby a piece of sheet material inserted between said punch and holder may be successively punched and a lacing hook set therein.

18. A lacing hook setting machine having, in combination, an anvil concentric with said punch, a holder, a punching die on said holder, a lacing hook carrier on said holder, mechanism constructed and arranged to rock said holder to alternately move said die and carrier into and out of alinement with said punch and anvil and mechanism constructed and arranged to move said holder toward and away from said punch and anvil, whereby when a piece of sheet material is inserted between said holder and said punch said sheet material will be forced onto said punch and a lacing hook set and clenched in said sheet material.

19. A lacing hook setting machine having, in combination, a pair of oppositely disposed punches and a pair of anvils arranged to point away from each other, a support therefor, means constructed and arranged to force a piece of sheet material onto each of said punches, and mechanism constructed and arranged to drive a lacing hook onto each of said punches.

20. A lacing hook setting machine having, in combination, a pair of oppositely disposed punches and a pair of anvils arranged to point away from each other, a support therefor, means constructed and arranged to position a piece of sheet material adjacent to the ends of each of said punches, means constructed and arranged to force a piece of sheet material onto each of said punches, and mechanism constructed and arranged to drive a lacing hook onto each of said punches.

21. A lacing hook setting machine having, in combination, a pair of oppositely disposed punches arranged to point away from each other, an anvil concentric with each of said punches, a support for said punches and anvils, means constructed and arranged to force a piece of sheet material on each of said punches and means constructed and arranged to drive a lacing hook onto each of said punches and clench the same in said sheet material.

22. A lacing hook setting machine having, in combination, a pair of oppositely disposed punches arranged to point away from each other, an anvil concentric with each of said punches, a support for said punches and anvils, means constructed and arranged to force a piece of sheet material on each of said punches, means constructed and arranged to drive a lacing hook onto each of said punches and clench the same in said sheet material, means to move said support laterally of said punches to feed said sheet material and means to strip said sheet material from said punches.

23. A lacing hook setting machine having, in combination, a pair of oppositely disposed punches arranged to point away from each other, an anvil concentric with each of said punches, a support for said punches and anvils, means to position a piece of sheet material adjacent to the ends of each of said punches, means constructed and arranged to force said pieces of sheet material onto said punches and means constructed and arranged to drive a lacing hook on each of said punches and clench the same in said sheet material.

24. A lacing hook setting machine having, in combination, a pair of oppositely disposed punches arranged to point away from each other, an anvil concentric with each of said punches, a support for said punches and anvils, means arranged to position a piece of sheet material adjacent to the ends of each of said punches respectively and comprising for each piece of sheet material a presser foot and a stripper coacting to hold one of said pieces of sheet material therebetween and means to move said presser foot and stripper into different positions relatively to each other.

25. A lacing hook setting machine having, in combination, a pair of oppositely disposed punches arranged to point away from each other, an anvil concentric with each of said punches, a support for said punches and anvils, means arranged to position a piece of sheet material adjacent to the ends of each of said punches respectively and comprising for each piece of sheet material a presser foot and a stripper coacting to hold one of said pieces of sheet material therebetween and means constructed and arranged to move said presser foot away from its respective stripper, whereby a piece of sheet material may be inserted between said presser foot and stripper.

26. A lacing hook setting machine having, in combination, a pair of oppositely disposed punches arranged to point away from each other, an anvil concentric with each of said punches, a support for said punches and anvils, means arranged to position a piece of sheet material adjacent to the ends of each of said punches respectively and comprising for each piece of sheet material a presser foot and a stripper coacting to hold one of said pieces of sheet material therebetween and means constructed and arranged to move said stripper away from its respective presser foot.

27. A lacing hook setting machine having, in combination, a pair of oppositely disposed punches arranged to point away from each other, an anvil concentric with each of said punches, a support for said punches and anvils, means arranged to position a piece of sheet material adjacent to the ends of each of said punches respectively and comprising for each piece of sheet material a presser foot and a stripper coacting to hold one of said pieces of sheet material therebetween and means constructed and arranged to move said stripper away from and toward its respective presser foot.

28. A lacing hook setting machine having, in combination, a pair of oppositely disposed punches arranged to point away from each other, an anvil concentric with each of said punches, a support for said punches and anvils, means arranged to position a piece of sheet material adjacent to the ends of each of said punches respectively and comprising for each piece of sheet material a presser foot and a stripper coacting to hold one of said pieces of sheet material therebetween, yielding means arranged to move said presser foot toward its respective stripper, yielding means arranged to move said stripper away from its presser foot and positive means arranged to move said stripper toward its respective presser foot.

29. A lacing hook setting machine having, in combination, a pair of oppositely disposed punches arranged to point away from each other, an anvil concentric with each of said punches, a support for said punches and anvils, means arranged to position a piece of sheet material adjacent to the ends of each of said punches respectively and comprising for each piece of sheet material a presser foot and a stripper coacting to hold one of said pieces of sheet material therebetween, yielding means arranged to move said presser foot toward its respective stripper, yielding means arranged to move said stripper away from its presser foot, positive means arranged to move said stripper toward its respective presser foot, means constructed and arranged to force a piece of sheet material onto each of said punches and means constructed and arranged to drive a lacing hook onto each of said punches and clench the same in said sheet material.

30. A lacing hook setting machine having, in combination, a pair of oppositely disposed punches arranged to point away from each other, an anvil concentric with each of said punches, a support for said punches and anvils, means arranged to position a piece of sheet material adjacent to the ends of each of said punches respectively and comprising for each piece of sheet material a presser foot and a stripper coacting to hold one of said pieces of sheet material therebetween, yielding means arranged to move said presser foot toward its respective stripper, yielding means arranged to move said stripper away from its presser foot, positive means arranged to move said stripper toward its respective presser foot, means constructed and arranged to force a piece of sheet material onto each of said punches, means constructed and arranged to drive a lacing hook onto each of said punches and clench the same in said sheet material, means to move said support laterally of said punches to feed said sheet material and means to strip said sheet material from said punches.

31. A lacing hook machine for simultaneously setting lacing hooks in the two opposing edges of a shoe upper having, in combination, punching instrumentalities embodying a pair of oppositely disposed punches, setting instrumentalities, means to position the two flaps of an upper relatively to said punches and comprising a pair of levers constituting presser feet, a pivot therefor, a stop for each of said levers, yielding means arranged to hold said levers against said stops and positive means arranged to engage said levers and move them away from said stops.

32. A lacing hook machine for simultaneously setting lacing hooks in the two opposing edges of a shoe upper having, in combination, punching instrumentalities embodying a pair of oppositely disposed punches, setting instrumentalities, means to position the two flaps of an upper relatively to said punches and comprising a pair of levers constituting strippers, a pivot therefor, yielding means arranged to move said strippers toward each other and positive means arranged to move said strippers away from each other.

33. A lacing hook machine for simultaneously setting lacing hooks in the two opposinging edges of a shoe upper having in combination, punching instrumentalities embodying a pair of punches, setting instrumentalities, means to position the two flaps of an upper relatively to said punches and comprising a pair of levers constituting strippers for said punches, a pivot for said levers, a pair of edge guides yieldingly supported and arranged to bear against said stripper levers and move them toward each other and positive means arranged to move said strippers and edge guides away from each other.

34. A lacing hook machine for simultaneously setting lacing hooks in the two opposing edges of a shoe upper having, in combination, punching instrumentalities embodying a pair of punches, setting instrumentalities and means to position the two flaps of said upper relatively to said punches comprising a pair of levers, constituting presser feet, a pair of levers constituting strippers for said punches, a pivot for said levers, a stop for each of said presser foot levers, yielding means arranged to hold said presser foot levers against said stops, yielding means arranged to move said strippers away from said presser foot levers and positive means arranged to move said strippers toward said presser foot levers, said positive means constructed and arranged to move said presser foot levers and said strippers in pairs away from each other.

35. A lacing hook machine for simultaneously setting lacing hooks in the two opposing edges of a shoe upper having, in combination, punching instrumentalities embodying a pair of punches, setting instrumentalities and means to position two flaps of an upper relatively to said punches and comprising a pair of levers constituting presser feet, a pivot therefor, a stop for each of said levers, yielding means arranged to hold said levers against said stops, a rock-shaft and a projection on said rock-shaft arranged to engage said levers and move said presser feet away from said stops and from each other.

36. A lacing hook machine for simultaneously setting lacing hooks in the two opposing edges of a shoe upper having, in combination, punching instrumentalities embodying a pair of punches, setting instrumentalities and means to position two flaps of an upper relatively to said punches and comprising a pair of levers constituting strippers, a pivot therefor, yielding means arranged to move said strippers toward each other, a rock-shaft and a projection on said rock-shaft arranged to engage said levers and move said strippers away from each other.

37. A lacing hook machine for simultaneously setting lacing hooks in the two opposing edges of a shoe upper having, in combination, a pair of oppositely disposed punches and a pair of anvils arranged to point away from each other, means constructed and arranged to force a piece of sheet material onto each of said punches, mechanism constructed and arranged to drive a lacing hook onto each of said punches and into said sheet material, an arm to which said punches are fastened and mechanism constructed and arranged to rock said arm, whereby said sheet material and lacing hooks may be fed.

38. A lacing hook machine for simultaneously setting lacing hooks in the two opposing edges of a shoe upper having, in combination, a pair of oppositely disposed punches and a pair of anvils arranged to point away from each other, means constructed and arranged to force a piece of sheet material onto each of said punches, mechanism constructed and arranged to drive a lacing hook onto each of said punches and into said sheet material, an arm to which said punches are fastened, mechanism constructed and arranged to rock said arm, whereby said sheet material and said lacing hooks may be fed and means to vary the distance said arm may be moved from a given point.

39. A lacing hook setting machine having, in combination, a punch, an anvil concentric with said punch, a holder, a punching die and a lacing hook carrier on said holder, a raceway, mechanism constructed and arranged to feed a lacing hook from said raceway onto said carrier and mechanism constructed and arranged to rock said holder to alternately bring said punching die and said carrier into alinement with said punch and mechanism constructed and arranged to move said holder toward and away from said punch and anvil.

40. A lacing hook setting machine having, in combination, a punch, an anvil concentric with said punch, a holder, a punching die and a lacing hook carrier on said holder, a raceway, mechanism constructed and arranged to feed a lacing hook from said raceway onto said carrier, mechanism constructed and arranged to rock said holder to alternately bring said punching die and said carrier into alinement with said punch, a bracket upon which said holder is pivoted to rock and mechanism constructed and arranged to impart a reciprocatory motion to said bracket, whereby said holder may be moved toward and away from said punch.

41. A double set lacing hook machine having, in combination, a pair of punches, a pair of anvils concentric with said punches, a pair of holders, a pair of brackets upon which said holders are pivoted to rock, a pair of cylindrical slides upon which said brackets are mounted, each bracket being fastened to one of said slides and having sliding engagement with the other of said slides, mechanism constructed and arranged to impart a reciprocatory motion to said slides, a punching die and a lacing hook carrier on each of said holders, said punches and anvils being interposed between said holders, and mechanism constructed and arranged to rock said holders to alternately move said dies and carriers into and out of alinement with said punches and anvils, whereby when two flaps of an upper are inserted, one between each die and its respective punch, said flaps will be forced onto said punches and a lacing hook set in each flap.

42. A lacing hook setting machine having, in combination, a punch, an anvil concentric with said punch, a support for said punch and anvil, means arranged to position a piece of sheet material adjacent to the cutting end of said punch, said means comprising a presser foot and a stripper coacting to hold said piece of sheet material therebetween, yielding means constructed and arranged to move said stripper away from said presser foot and positive means to move said stripper toward said presser foot.

43. A lacing hook setting machine having, in combination, a punch, an anvil concentric with said punch, a support for said punch and anvil, means arranged to position a piece of sheet material adjacent to the cutting end of said punch, said means comprising a presser foot and a stripper coacting to hold said piece of sheet material therebetween, yielding means constructed and arranged to move said stripper away from said presser foot, positive means to move said stripper toward said presser foot, and positive means constructed and arranged to move said presser foot away from said stripper, whereby a piece of sheet material may be inserted between said presser foot and stripper.

44. A lacing hook setting machine having, in combination, a punch, an anvil concentric with said punch, a support for said punch and anvil, means arranged to position a piece of sheet material adjacent to the cutting end of said punch and comprising a presser foot and a stripper coacting to hold said piece of sheet material therebetween, yielding means arranged to move said presser foot toward said stripper, yielding means arranged to move said stripper away from said presser foot and positive means arranged to move said stripper toward said presser foot.

45. A lacing hook setting machine having, in combination, a punch, an anvil concentric with said punch, a support for said punch and anvil, means arranged to position a piece of sheet material adjacent to the cutting end of said punch, said means comprising a presser foot and a stripper coacting to hold said piece of sheet material therebetween, yielding means arranged to move said presser foot toward said stripper, yielding means arranged to move said stripper away from said presser foot, positive means arranged to move said stripper toward said presser foot, means constructed and arranged to force a piece of sheet material onto said punch and means constructed and arranged to drive a lacing hook onto said punch and clench the same in said sheet material.

46. A lacing hook setting machine having, in combination, a punch, an anvil concentric with said punch, a support for said punch and anvil, means arranged to position a piece of sheet material adjacent to the cutting end of said punch and comprising a presser foot and a stripper coacting to hold said piece of sheet material therebetween, yielding means arranged to move said presser foot toward said stripper, yielding means arranged to move said stripper away from said presser foot, means constructed and arranged to force a piece of sheet material onto said punch, means constructed and arranged to drive a lacing hook onto said punch and clench the same in said sheet material, means to move said support laterally of said punch to feed said sheet material and positive means constructed and arranged to move said stripper toward said presser foot and simultaneously to strip said sheet material from said punch.

47. A lacing hook setting machine having, in combination, a punch, an anvil concentric with said punch, a support for said punch and anvil, means arranged to position a piece of sheet material adjacent to the cutting end of said punch and comprising a pair of clamping jaws, a punching die independent of said clamping jaws, mechanism constructed and arranged to move said punching die toward and away from said punch and means to actuate said clamping jaws to clamp said sheet material between them prior to the punching operation.

48. A lacing hook setting machine having, in combination, a punch, an anvil concentric with said punch, a support for said anvil and punch, means arranged to position a piece of sheet material adjacent to the cutting end of said punch and comprising a pair of clamping jaws, a punching die, a lacing hook carrier, mechanism constructed and arranged to move said punching die and lacing hook carrier alternately into alinement with said punch, mechanism constructed and arranged to move said punching die and lacing hook carrier alternately toward and away from said punch, whereby said sheet material may be punched and a lacing hook set therein, means constructed and arranged to move said punch laterally thereof to feed said sheet material, means constructed and arranged to actuate said clamping jaws to clamp said sheet material between them prior to the punching operation and to operate said clamping jaws to release said sheet material during the feeding operation, said means constructed and arranged to strip said material from said punch at the end of the feeding operation and means to actuate said clamping jaws to clamp said material therebetween during the return movement of the feeding punch.

49. A lacing hook setting machine having, in combination, a punch, an anvil concentric with said punch, a support for said punch and anvil, means arranged to position a piece of sheet material adjacent to the cutting end of said punch and comprising a pair of clamping jaws, a punching die, a lacing hook carrier, mechanism constructed and arranged to move said punching die and lacing hook carrier alternately into alinement with said punch, mechanism constructed and arranged to move said punching die and lacing hook carrier alternately toward and away from said punch, whereby said sheet material may be punched and a lacing hook set therein and means to actuate said clamping jaws to clamp said sheet material between them prior to the punching operation.

In testimony whereof I have hereunto set my hand in presence of two subscribing witnesses.

ARTHUR R. HAVENER.

Witnesses:
CHARLES S. GOODING,
SYDNEY E. TAFT.

Copies of this patent may be obtained for five cents each, by addressing the "Commissioner of Patents, Washington, D. C."